United States Patent [19]

Stisen

[11] Patent Number: 4,519,808

[45] Date of Patent: May 28, 1985

[54] STRAW FUEL BRIQUETTE PRESS

[76] Inventor: Børge Stisen, Kirseb rhaven 72, 3480 Fredensborg, Denmark

[21] Appl. No.: 433,210

[22] PCT Filed: Jan. 21, 1982

[86] PCT No.: PCT/DK82/00004

§ 371 Date: Sep. 29, 1982

§ 102(e) Date: Sep. 29, 1982

[87] PCT Pub. No.: WO82/02995

PCT Pub. Date: Sep. 16, 1982

[30] Foreign Application Priority Data

Mar. 10, 1981 [DK] Denmark ............................ 1072/81

[51] Int. Cl.[3] ........................ C10L 5/44; A01F 15/04; B30B 11/16

[52] U.S. Cl. ....................................... 44/10 A; 44/13; 100/38; 100/155 R

[58] Field of Search .............. 44/1 D, 2, 10 A, 11–13, 44/28–30; 100/177, 155, 38, 41

[56] References Cited

U.S. PATENT DOCUMENTS

| | | | |
|---|---|---|---|
| 3,323,444 | 6/1967 | Mark et al. | 100/38 |
| 3,348,475 | 10/1967 | Fenster et al. | 100/177 |
| 3,780,646 | 12/1973 | Ancellin | 100/155 |
| 3,946,660 | 3/1976 | Kuhtreiber | 44/10 A |

FOREIGN PATENT DOCUMENTS

| | | | |
|---|---|---|---|
| 18394 | 1/1914 | Denmark . | |
| 35431 | 9/1981 | European Pat. Off. | 44/1 D |
| 2401666 | 7/1975 | Fed. Rep. of Germany | 44/1 D |

*Primary Examiner*—Carl F. Dees

[57] ABSTRACT

A straw briquette press in form of a towable machine can in the field pick up straw or receive it from another traversing machine and press said straw to briquettes having a stable shape and density of about 1 g/cm$^3$. The machine employs a high-speed finger press receiving the straw from a conventional feed device. The finger press consists of two rotatable blocks (1) which perform synchronized, oppositely directed rotary oscillations at great speeds. The two blocks (1) are provided with fingers (1) which grip straw during the first phase of a working stroke and then engage each other and perform a massive piston-like movement during the last phase of the working stroke when the straw is subjected to high-compression. During the return stroke the fingers are withdrawn in the same opposite paths. The two synchronized and oppositely directed movements provide a vibration-free operation. A toggle (6) is interposed between the driving connecting rod (5) and the oscillating blocks (1), resulting in a favorable spreading of the force necessary for the high-compression. The finger press forces the high-compressed straw out into the kiln pipe (3) in a cylindrical kiln (7) where the counter-pressure required for the compression occurs in the form of friction. The compressed straw is heated in the kiln pipe (3) and gives off developed vapors through evaporation apertures, to thereby plasticize the straw. This means that the straw can be pressed to great permanent density. The heating moreover gives the briquette a firm and water-repellent crust without separate addition of binders.

5 Claims, 4 Drawing Figures

STRAW FUEL BRIQUETTE PRESS

Figure 1:
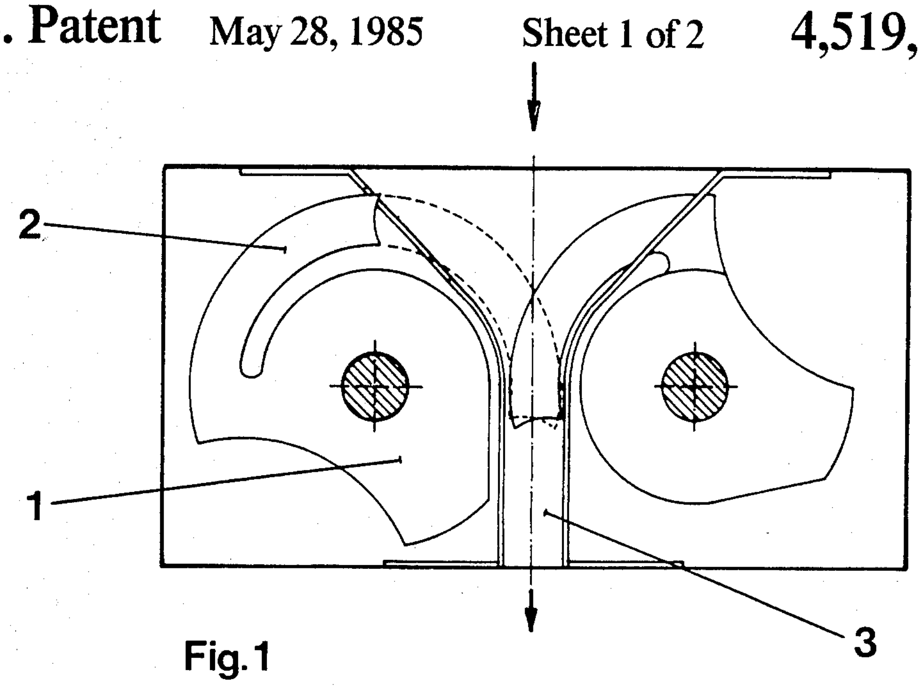

The invention relates to a method of producing straw briquettes of a stable shape from whole, unchopped straws in a briquette pressing means.

The art comprises straw briquette presses for compressing straw to solid fuel in the form of briquettes. These straw presses are not transportable, but stationarily operating machines using known techniques with flywheels, cranks and plungers. The stationary operation has not made straw balers superfluous as the straw is transported to the briquette press in the form of bales. Further, a separate binder is generally added to provide a briquette having a stable shape.

The Danish Patent Specification 18 394 discloses a straw packer having two pistons where the straw when compressed is folded and stacked in layers in front of the pistons.

The U.S. Pat. No. 3,348,475 discloses a press for making briquettes from hay which is present in the form of whole straws and is subjected to simple compression while being fed forwardly in a cylinder.

The U.S. Pat. No. 3,780,646 discloses a fibre compression apparatus in which the fibre material is squeezed into the pressing conduit of a roller press by a feed means having two cooperating rotary oscillating pistons and is subjected to progressive compaction by the rollers of the press.

Straw briquettes having a density of approximately 0.7 g/cm$^3$ can be made by means of the known devices. They are not resistant to moisture because of an incoherent surface.

The U.S. Pat. No. 3,323,444 discloses a press for making briquettes from hay in which the hay while being compressed is heated to cause it to plasticize and to permit additional compression and formation of a shape-stabilizing skin on the briquettes. The vapours developed during the heating process have no possibility of escaping during the compression, which accordingly cannot be complete here either.

The object of the invention is to provide a method of producing straw briquettes having a stable shape and a density of approximately 1 g/cm$^3$ with a minimum energy consumption and without using any binders.

This is achieved according to the invention by a method in which the straws in the briquette pressing means are subjected to a compaction of a relatively high frequency at a high pressure by a set of means whose working motions are symmetrical, to form a sausage of straw, and that the formed sausage of straw is allowed to give off vapours during subsequent heating.

The invention also comprises an apparatus for carrying out the method, and this apparatus is characterized in that the briquette pressing means is shaped as two rotatable blocks which are provided with fingers and to which synchronized, oppositely directed rotary oscillations are imparted by means of a high-speed mechanism having a dead center in the most advanced end position of the fingers in engagement with the straws; and in that the subsequent heating means comprises a briquette feed pipe which is externally heated by means of hot air and has a set of radially extending evaporation apertures in the pipe wall. In the pressing means the straws are subjected to pressure impacts totalling 30 to 50 metric tons about 8 times per second, resulting in a compression in the longitudinal direction of approximately 0.5 cm per impact, i.e. approximately 4 cm/s = 144 m/h. This gives with a cross sectional area of $8.5\times5.0=42$ cm$^2$ a production capacity of $0.42\times1440$ dm$^3$ = 600 l/h ~ 600 kg/h. Thus, with a total power consumption of 50 kW the output of the apparatus of the invention is about 12 kg/kWh. By comparison, the known stationary briquetting machines can produce about 1000 kg/h with a power consumption of about 150 kW, which corresponds to an output of about 7 kg/kWh.

The briquette feed pipe is cylindrical in shape, and the evaporation apertures are formed as longitudinal rows of holes in the pipe wall, or the pipe is made of polygonally disposed bars clamped against each other and having longitudinal slots serving as evaporation apertures.

Being fitted with a feed device, the straw briquette press of the invention can as a fully mobile unit in the field compact the loose straw directly from the combine or the ground into straw briquettes without the use of binders. The compressed straw is heated in a tube kiln to cause the elasticity of the straw to disappear. The heating also affects adhesives in the straw in the surface of the briquettes so that the surface hardens and gives a water-repellent briquette of a stable shape.

Figure 4:
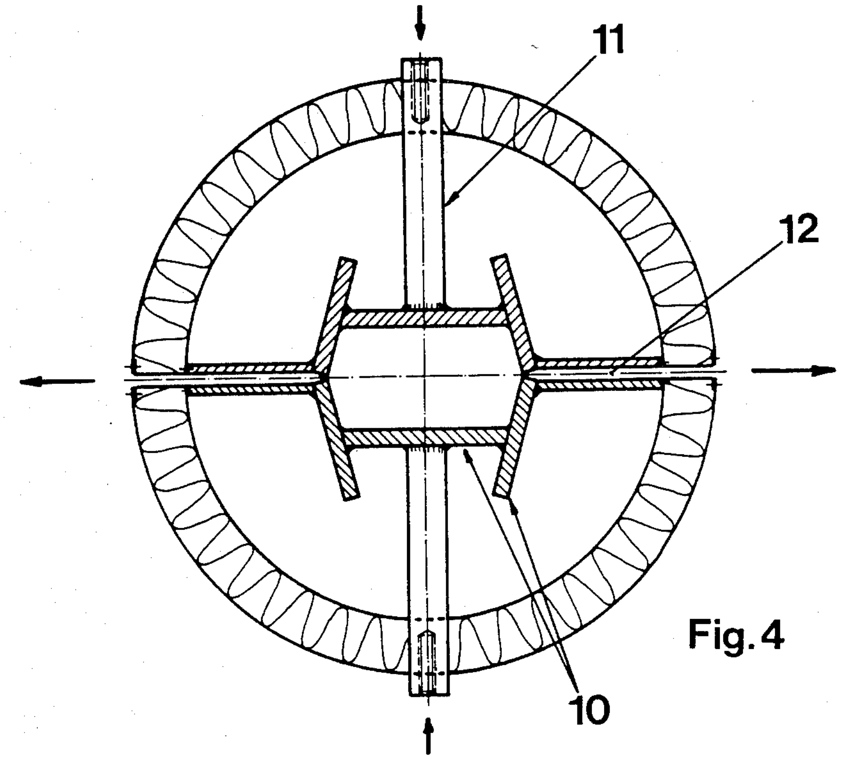
Figure 2:
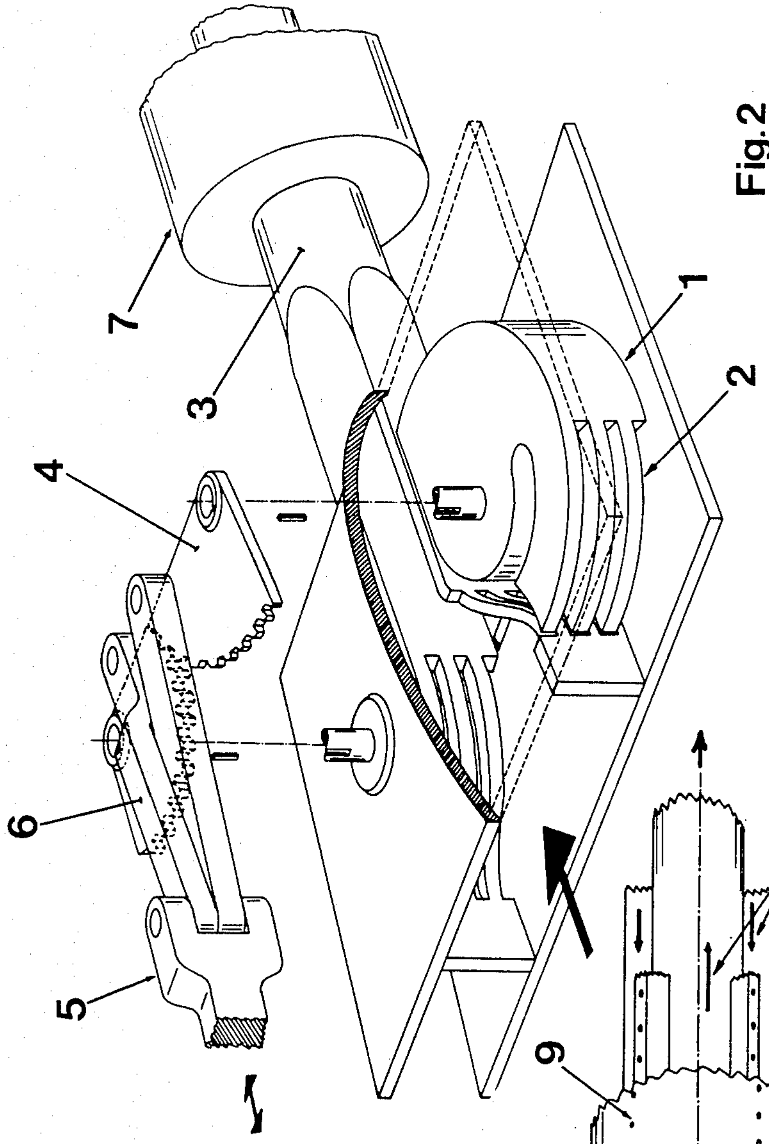
Figure 3:
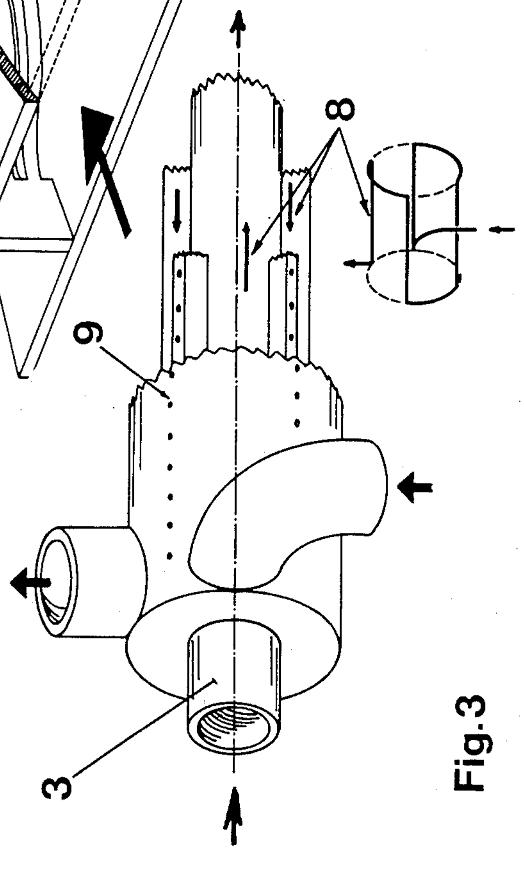

The invention will be explained more fully below with reference to the drawing, in which FIG. 1 is a plan view of the finger movement in the apparatus of the invention, FIG. 2 is a perspective view of the finger press in the apparatus of the invention, and FIGS. 3 and 4 show two different embodiments of the cylindrical kiln in the apparatus of the invention.

The straw briquette press is a complete machine which in the field picks up the straw from the ground by means of a pick-up drum, receives the straw directly from the straw discharge of the combine or receives the straw in a semi-compressed state from the conventional straw baler. The straw is conveyed to a conventional feed table in the form of a hopper-shaped front member of the finger press. The feed table is provided with introducing arms which during the introduction compress the straw in a vertical plane to a channel height corresponding to the inlet of the finger press.

The finger press, as shown in FIG. 2, is a compact unit where the final high-compression takes place. The compression is effected by two rotatable blocks 1 which perform synchronized, oppositely directed rotary oscillations of about 110° at great speeds. The two blocks are provided with fingers 2 which grip straw during the first part of a working stroke and then engage each other and perform a massive piston-like movement during the last phase of the working stroke when the straw is subjected to high-compression. The return stroke, where the fingers are disengaged and returned, does not cause blocking because the fingers follow the same path as during the working stroke.

The compressed straw, which still has its full elasticity, is prevented from withdrawing by barbs in the compression channel 3 of the apparatus. The movement of the fingers in connection with the gripping of straw and the engagement makes it unnecessary to chop the straw prior to compression.

The finger press produces a high-compressed sausage of straw of great coherence partly because of the use of whole straws, partly because of the mutual movement of the fingers during the last phase of the working stroke, which provides a good adhesive face for the subsequent straw.

The two finger blocks 1 are moved in synchronism by means of two gear segments 4. The oscillating rotary movement is provided for by a connecting rod 5 or a rotary cam disk. The connecting rod 5 drives the finger blocks 1 by means of two push rods 6 attacking the finger blocks eccentrically. The push rods 6 are mounted so as to provide a toggle function which—with a given push rod movement—gives a great force and a small movement during the last phase of the working stroke. This results in a desirable smoothing of the forces associated with the compression and of the power consumption. The connecting rod 5 can be moved synchronously with the arm movement of the feed table so that straw will be fed to the finger press immediately before the beginning of a working stroke.

Owing to the oppositely directed movements of the finger blocks, an operation almost free of vibrations can be obtained. This in turn entails that the finger press can operate fast, which results in a high production capacity.

The straw is pressed into a cylindrical kiln 7 in which it is heated to about 250° C. The heating causes the straw to plasticize so that further compression can take place. The plastic state also allows the compressed shape to be retained after cooling. The surface of the compressed sausage of straw forms a shell during the heating process, and this shell has both a binding and a water-repellent effect.

The cylindrical kiln 7 can, as shown in FIG. 3, be constructed as two concentric tubes with the sausage of straw in the inner tube, and a channel system 8 between the tubes. Hot air is blown in the channel system 8, e.g. from an oil burner. The supply of heat is controlled so as to maintain a constant temperature in the inner tube. The tube walls are formed with radial evaporation apertures 9 through which the sausage of straw can discharge the vapours developed during the heating process to the atmosphere.

The inner tube of the cylindrical kiln may also, as shown in FIG. 4, be made of simple flat bars 10 kept clamped against each other by means of stay bolts 11 having intermediate longitudinal air gaps 12 through which the vapors can escape.

The length of the cylindrical kiln is determined so that at maximum press capacity sufficient heat will penetrate into the sausage of straw to make it plastic. If straw briquettes of uniform length are desired, the kiln can easily be provided with a cutter device.

I claim:

1. A process of producing in the field straw briquettes from straw fibers, comprising the steps of: in compaction means forming a sausage of straw fibers, and subjecting the straw fibers in said compaction means during conveyance therethrough to compaction impacts of a relatively high frequency at high pressure in a symmetrical manner on both longitudinal sides of said sausage of straw fibers.

2. A transportable apparatus for making straw briquettes comprising: briquette pressing means shaped as two rotatable blocks arranged side by side, fingers associated with said rotatable blocks, and a high speed mechanism for imparting synchronized, oppositely directed rotary oscillations to said fingers, the arrangement being such that said high speed mechanism reaches a dead center position in the most advanced end position of the fingers in engagement with straw fibers.

3. A transportable apparatus according to claim 2, comprising heating means including a briquette feed pipe, means for heating said briquette feed pipe externally, and a plurality of radially extending evaporation apertures in said feed pipe.

4. An apparatus according to claim 3, wherein said briquette feed pipe is cylindrical in shape, and wherein said evaporation apertures are formed by longitudinal rows of holes in said pipe.

5. An apparatus according to claim 3, wherein said briquette feed pipe is composed of polygonally disposed flat bars clamped against each other, and having longitudinal slots forming said evaporation apertures.

* * * * *